United States Patent Office 2,699,405
Patented Jan. 11, 1955

2,699,405

COATING CELLOPHANE AND THE LIKE

Charles M. Rosser, Fredericksburg, Va., assignor to American Viscose Corporation, Philadelphia, Pa., a corporation of Delaware No Drawing. Application November 3, 1951, Serial No. 254,794

11 Claims. (Cl. 117—63)

This invention is related to the coating of cellophane and other non-fibrous hydrophilic pellicles with resinous materials and is particularly concerned with a coating procedure in which thermosetting resin precondensates and an acid catalyst are applied to the cellophane film or the like. Such coated films have been used heretofore as wrapping sheets or have been treated with additional coatings, such as moistureproof and/or heat-sealing coatings, to provide other types of wrapping materials.

The resin precondensates with which the invention is concerned are those of melamine, urea, or other amines, with an aldehyde, such as acetaldehyde and especially formaldehyde. Various acids have been suggested for use with such resins for the purpose of catalyzing or accelerating the polymerization to the infusible state and also for the purpose of dispersing the precondensate in water to provide a stable aqueous medium adapted to be applied as a coating medium. Among the acids, organic acids, such as hydroxyacetic and lactic, have been used; the most common suggested has been hydrochloric acid because of its inexpensiveness and availability. In coating cellophane with such resin precondensates, the practice heretofore suggested was to follow the impregnation with the aqueous acidic resin dispersion by a step of washing for the purpose of reducing the acid content in order to prevent excessive tendering and weakening of the film as a result of the content of acid incorporated by this coating procedure. However, the washing out of the acid is accompanied by a washing out of a part of the resin precondensate. It also requires an extensive travel of the film through the washing bath and, of course, the length of such bath is increased in proportion to increases in the speed of travel.

It is an object of the present invention to neutralize the residual acid from the film used in dispersing the resin so that it cannot cause a tenderizing and weakening of the coated film. A further object is to neutralize the residual acid without the need for a washing step and without the need for the equipment or vessels for applying the washing liquids. Further objects and advantages of the invention will be apparent from the description thereof hereinbelow.

In general, the invention comprises the impregnation of a cellophane sheet with a dispersion of a thermosetting resin precondensate in an aqueous acid medium and then, without washing, passing the impregnated sheet into a plasticizing bath containing a small amount of an alkaline lithium compound, such as lithium carbonate, lithium bicarbonate, or lithium hydroxide for neutralizing the acid. Subsequently, the plasticized film may be dried and, if desired, coated with a moistureproof and/or heat-sealing composition of any type.

When a lithium compound is used to neutralize the acid carried by the impregnated film as it passes into the plasticizing bath, there is produced a lithium salt which serves as a plasticizer for the cellophane. For example, when the resin precondensate is dispersed in the presence of hydrochloric acid, lithium chloride is formed. If desired, the concentration of plasticizer in the plasticizing bath may be somewhat reduced to compensate for the amount of lithium salt plasticizer that is formed by neutralization of the acid carried by the film into the plasticizing bath.

While reference hereinabove has been made to cellophane sheets, by which is meant sheets or films of regenerated cellulose, the invention is applicable to other hydrophilic pellicular material, such as sheets of cellulose ethers, especially the alkali-soluble, water-insoluble cellulose ethers formed by the reaction of cellulose with ethylene oxide, methyl chloride, or ethyl chloride. The regenerated cellulose may be produced by the viscose process, the cuprammonium process, or by the denitration of nitrocellulose. The impregnation of the pellicle may be effected prior to its first drying during initial formation of the sheet or film, or, it may be effected upon a dried sheet. Preferably, the impregnation is carried out during the initial production of the sheet while it is still in the wet gel stage. The impregnation in this stage may be preceded by the removal of excess liquid just before the sheet or film reaches the place where impregnation by the resin precondensate is to be effected. If desired, a portion of the absorbed moisture may be removed prior to impregnation but preferably the moisture content of the sheet or film at the time of impregnation by the resin precondensate is at least 25 to 65% by weight of the wet gel sheet.

The dispersion of resin precondensate may be any of those disclosed in U. S. Patent 2,345,543, particularly of the melamine-formaldehyde variety. It may be a urea-formaldehyde precondensate, or it may be a mixed melamine- and urea-formaldehyde precondensate, as well as the urea-containing melamine-formaldehyde precondensate disclosed in U. S. Patent 2,564,925.

While the alkaline lithium compound may be provided in a separate bath through which the impregnated sheet or film is passed prior to passage through the plasticizing bath, it is preferable that the neutralizing and plasticizing bath be combined in a single container. In this fashion, film-producing machines need no additional containers besides that needed for impregnating with the resin precondensate.

The plasticizer bath may contain glycerol, or any other known plasticizer for cellulosic materials provided they do not react with the alkaline lithium compound or its salt to provide an insoluble residue or material. Examples of other plasticizers are sorbitol, ethylene glycol, ethanolamine lactate, ammonium sulfamate, sodium lactate, ethylene oxide condensation products of sorbitol, glycerol or urea, or the like.

The resin precondensate dispersion may contain from 0.5% to 20% by weight, and preferably from 2 to 5% by weight, of the precondensate. The plasticizing bath may contain from 3 to 10% of the plasticizer, preferably 4 to 5% by weight thereof. In addition, it may be provided with about 0.01 to 0.1% of the alkaline lithium compound, preferably just sufficient to be slightly in excess of the acid entering on the film. If a separate neutralizing bath is provided before the plasticizing bath, it may contain 0.01 to 0.1% by weight of the alkaline lithium compound dissolved in water. In addition, a small amount of a fungicide may be incorporated in the neutralizing and/or plasticizing baths.

In the following examples, the parts and percentages given are by weight:

Example I

A mixture of 20 parts of partially polymerized, hydrophobic melamine-formaldehyde resin, 35 parts urea, 35 parts water and 10 parts of 85% lactic acid was stirred together at room temperature until the solution was substantially complete. This solution was diluted to a 5% concentration. A wet gel regenerated cellulose pellicle was passed through the solution through such a path that all parts of the film was in contact with the solution for a period of ten seconds. The impregnated film was then passed into an aqueous bath containing 5% glycerin and 0.05% of lithium hydroxide. Excess liquid was removed from the film after it left each bath and the plasticized and neutralized film was then dried.

Example II

Three mols of melamine were mixed with 10 mols of a 30% aqueous formaldehyde to give a solution having a pH of 9.0. The solution was heated for 30 minutes, cooled, and the resulting crystalline condensate separated and dried. Fifty parts by weight of the condensate were dissolved in an aqueous solution containing 27.6 parts of 18° Bé. hydrochloric acid and 125 parts of water thus giving a solution containing 25% of the resin. This solution was diluted to 14% resin and allowed to age at room temperature for 24 hours until a bluish haze developed. A sheet of regenerated cellulose in the wet gel state was then passed through the resin solution, the immersion taking 20 seconds. After removal of excess impregnant from the film, the film was passed into a plasticizing bath containing 5% glycerine and 0.1% of lithium bicarbonate. After removal of excess plasticizing bath, the film was dried.

*Example III*

A wet gel regenerated cellulose film was passed continuously during its production and after complete regeneration, washing, and desulfurization, but before its first drying through an aqueous solution containing 10% of a water-soluble urea-formaldehyde precondensate and ¼% of hydrochloric acid. The passage through the bath took 15 seconds. After removal of excess liquid from the impregnated film, it proceeded continuously into a bath containing 0.01% lithium carbonate and then through a bath containing 5% glycerine. After removal of excess moisture, the film was dried.

*Example IV*

Each of the coated films produced in the preceding Examples I to III were coated with a moistureproof heat-sealable lacquer having the following composition:

| | Parts |
|---|---|
| Nitrocellulose (11.6% N) | 50 |
| Dicyclohexyl phthalate | 30 |
| Dibutyl phthalate | 10 |
| Dewaxed dammar | 7.5 |
| Paraffin wax (M. P. 60° C.) | 2.6 |

After drying of the moistureproof and heat-sealing coating on the films, it was found that they were well anchored so that they resisted separation when exposed to water and that the coated sheets retained their strength over long periods of time.

It is to be understood that changes and variations may be made without departing from the spirit and scope of the invention as defined in the appended claims.

I claim:

1. A process of treating a non-fibrous hydrophilic cellulosic pellicle which comprises impregnating the pellicle with a thermosetting resin precondensate selected from the group consisting of precondensates of formaldehyde with melamine, urea, and mixtures thereof which are solubilizable by the addition of acid, in the presence of a small amount of acid, and then precipitating the precondensate in the pellicle in insoluble form by neutralizing the acid with an alkaline lithium compound.

2. A process according to claim 1 including the step of impregnating the pellicle with a plasticizer therefor simultaneously with the neutralization with acid.

3. A process as defined in claim 2 in which the neutralization is effected by passing the pellicle through an aqueous bath containing a plasticizer and a small proportion of the alkaline lithium compound.

4. A process as defined in claim 3 in which the pellicle is a regenerated cellulose pellicle.

5. A process as defined in claim 4 in which the resin precondensate is one of melamine and formaldehyde and the acid is hydrochloric acid.

6. A process as defined in claim 5 in which the impregnation is effected during the manufacture of the regenerated cellulose pellicle in continuous fashion after the complete regeneration of the pellicle but prior to sufficient drying thereof to terminate the wet gel condition of the pellicle.

7. A process as defined in claim 6 in which the concentration of the resin precondensate is between ½ and 20% and the concentration of the plasticizer is between 3 and 10%.

8. A process as defined in claim 1 in which the resin precondensate is one of melamine and formaldehyde.

9. A process as defined in claim 1 in which the resin precondensate is one of urea and formaldehyde.

10. A process as defined in claim 3 in which the concentration of the alkaline lithium compound is between 0.01 and 0.1%.

11. A process as defined in claim 4 in which the concentration of the alkaline lithium compound is between 0.01 and 0.1%.

References Cited in the file of this patent

UNITED STATES PATENTS

| Number | Name | Date |
|---|---|---|
| 2,095,129 | Drew | Oct. 5, 1937 |
| 2,122,418 | Gladding et al. | July 5, 1938 |
| 2,280,829 | Jebens | Apr. 28, 1942 |
| 2,417,014 | Pollard | Mar. 4, 1947 |
| 2,575,443 | Cornwell | Nov. 29, 1951 |